May 31, 1927.  W. A. GUNNING  1,630,264
EDGING MACHINE
Filed June 15, 1925  3 Sheets-Sheet 1
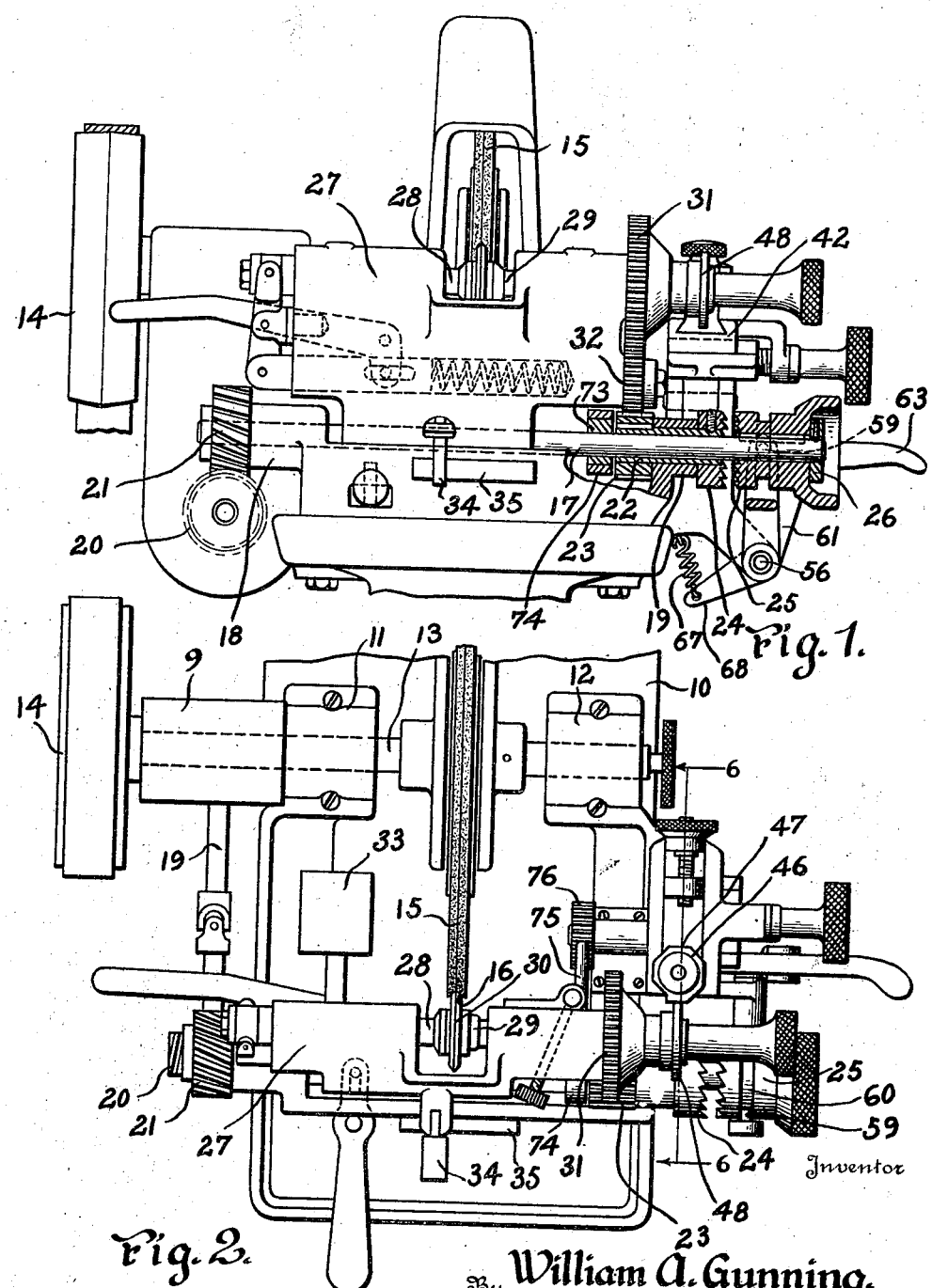
Inventor
By William A. Gunning.
Harry H. Styll
Attorney May 31, 1927. 1,630,264
W. A. GUNNING
EDGING MACHINE
Filed June 15, 1925    3 Sheets-Sheet 2

Inventor
William A. Gunning.
By Harry H. Styll
Attorney

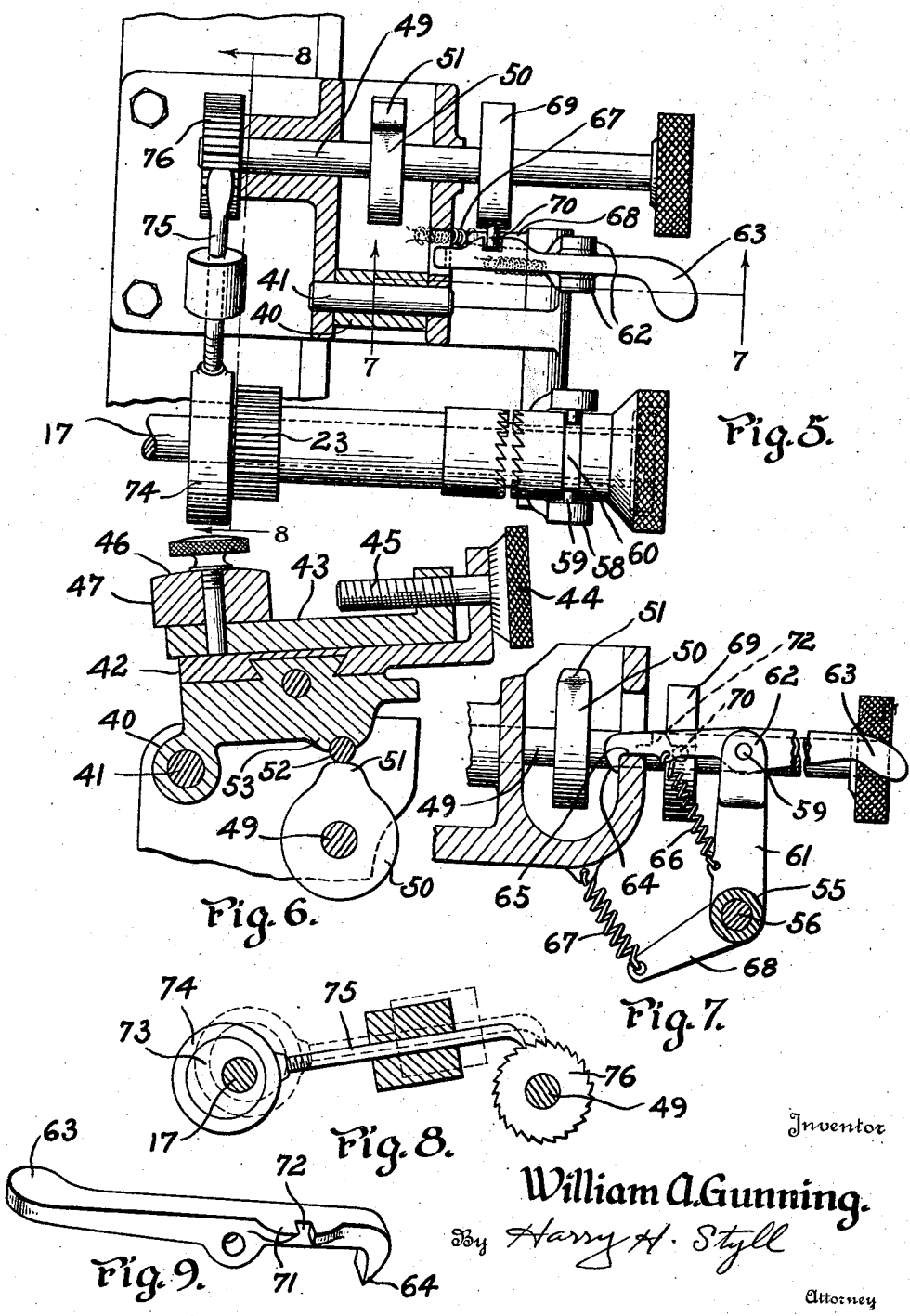

Patented May 31, 1927.

1,630,264

UNITED STATES PATENT OFFICE.

WILLIAM A. GUNNING, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EDGING MACHINE.

Application filed June 15, 1925. Serial No. 37,205.

The present invention relates to new and useful improvements in edging machines and has particular reference to means for automatically moving the lens away from the grinding stone and for stopping the rotation thereof.

In the manufacture of ophthalmic lenses, it is customary to cut a lens preferably about one millimeter over size and then with the aid of an edging machine to grind the lens until the edge thereof is properly surfaced. Machines of this character, include briefly a grinding stone and a pivotally mounted lens carriage in which is mounted a pair of oppositely disposed shafts between which is clamped a lens to be ground, means also being provided for urging the carriage towards the grinding stone and for retaining the lens in contact therewith during the edging operation. In the majority of such machines heretofore produced, it is necessary after the lens has been sufficiently ground to manually move the same together with the lens carriage away from the grinding stone and, by a separate operation to stop the rotation of the lens clamping shafts before the finished lens can be removed, and another inserted therefor. This, of course, has necessitated the expenditure of considerable time on the part of the operator, especially when he is watching over a number of machines. Moreover, the operator could not tell when the lens was finished without looking directly down upon the machine.

It was therefore found desirable to produce a machine so constructed that after the lens has been properly surfaced, it would be automatically caused to move away from the grinding stone and the rotation thereof also automatically stopped so that all the operator would have to do would be to remove the finished lens and insert another in its place. Such a construction would save considerable time inasmuch as the operator would know exactly when the lens was finished and would not be required to keep constantly watching the machine, neither would it be necessary for him to manually move the lens away from the grinding stone and then stop the rotation thereof before he could remove the finished lens and insert another to be ground.

An important object of the present invention is therefore, to provide a machine of the character stated having means for automatically moving the lens together with the lens carriage away from the grinding stone after the lens has been ground to a predetermined desired size and shape.

Another object is to provide such a machine so constructed that the rotation of the lens will be stopped after the said lens has been moved away from the grinding stone.

Another object is to provide such a machine wherein the rotation of the lens will be stopped by means of an automatic clutch mechanism.

Another object is the provision of a machine of this character so constructed that the lens will be automatically moved away from the grinding stone after it has rotated a predetermined number of revolutions.

Another object is the provision of a machine including means for regulating the number of revolutions of the lens prior to its being moved away from the grinding stone.

Another object is to provide such a machine wherein the means for automatically moving the lens away from the stone and for stopping the rotation thereof act in cooperation with each other and perform their separate functions almost simultaneously.

Another object is to provide such a machine which will be comparatively simple in construction, yet practical and efficient in its operation and which will, furthermore save both time and labor.

Other objects and advantages will become more readily apparent during the course of the following description when taken in connection with the accompanying drawings.

In the drawings forming a part of this application:

Figure 1 is a front elevation, partly in section, of an edging machine constructed in accordance with the present invention.

Figure 2 is a top plan view thereof.

Figure 5 is a horizontal sectional view on line 5—5 of Figure 3.

Figure 6 is a transverse sectional view on 6—6 of Figure 2.

Fig. 7 is a sectional view on line 7—7, Fig. 5.

Figure 8 is a sectional view on line 8—8 of Figure 5.

Figure 9 is a perspective view of the lever.

Figure 3:
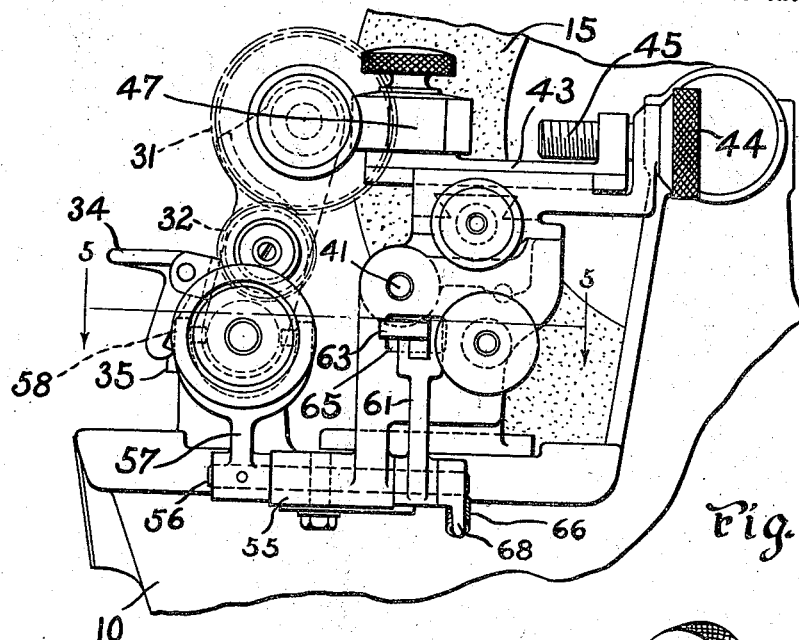
Figure 3 is a side elevation of the same.
Figure 4:
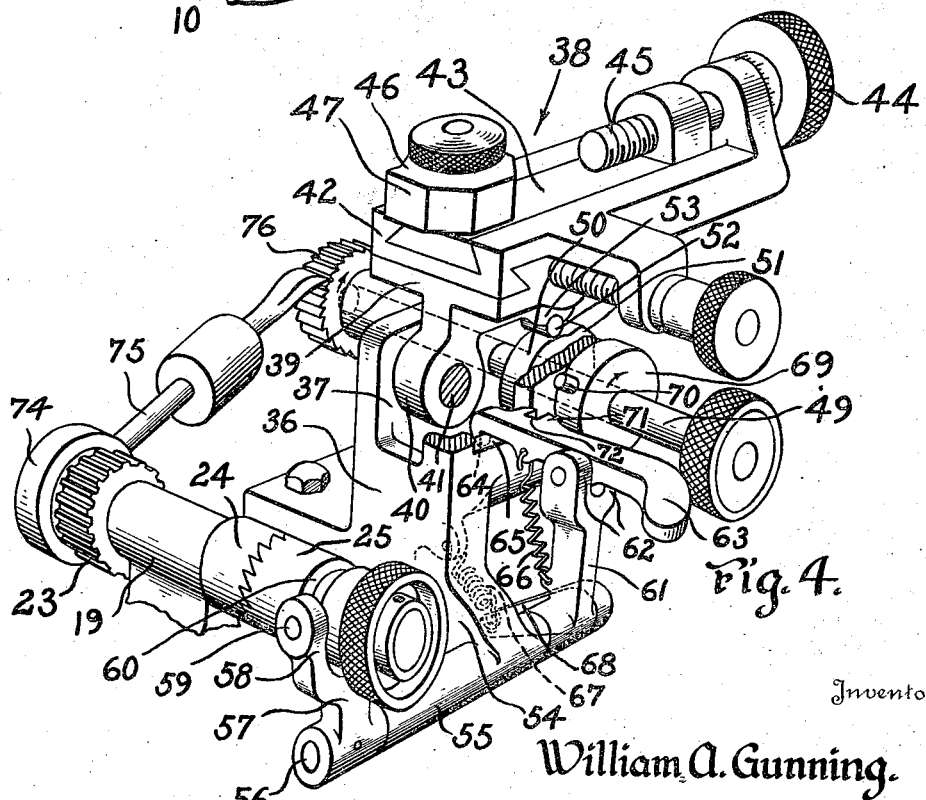
Figure 4 is a perspective view showing the mechanism for automatically moving the lens away from the grinding stone and for stopping the rotation thereof.

In the drawings wherein for the purpose of illustration is shown a preferred embodiment of the present invention, the numeral 10 designates the base member of a bevel edging machine provided with the bearings 11 and 12 in which is rotatably mounted a shaft 13, which shaft extends beyond the base member at one side thereof and to the extended portion of which is secured a pulley 14, by means of which power is applied to the shaft 13 and subsequently to the entire machine. Mounted on the shaft 13, between the bearings 11 and 12 is a grinding stone 15, having a V-shaped groove 16 in the periphery thereof.

Arranged forwardly of the shaft 13 and parallel thereto is a shaft 17 mounted in the bearings 18 and 19, this shaft 17 being driven by the shaft 13 through suitable gearing enclosed in the casing 9, a universally jointed shaft 19 and a pair of spiral gears 20 and 21 respectively, the latter of which is secured to the shaft 17. Mounted on the opposite end of the shaft 17 and within the bearing 19, is an elongated bushing 22 to the inner end of which is keyed a gear wheel 23 while a stationary clutch section 24 is secured to the outer end thereof, said stationary clutch section arranged to cooperate with the movable clutch section 25, slidably keyed to the shaft 17 and held thereon by means of a lock nut 26.

Pivotally mounted on the shaft 17, between the bearings 18 and 19 is a lens carriage, generally designated by the reference character 27, the upper or free end of said carriage containing the opposed lens clamping shafts 28 and 29, between which is arranged to be clamped the lens 30 which is to be ground within the groove 16. The lens clamping shafts are rotated by means of a large gear 31 secured to the outer end of the shaft 29, which gear is driven from the gear 23 on the shaft 17 through an idler gear 32.

Thus, as the movable clutch section 25 is moved to engage the stationary clutch section 24, the bushing 22 and the gear 23 will rotate with the shaft 17 and this rotation will be conveyed to the lens clamping shafts 28 and 29 through the gears 31 and 32 but when the said movable clutch section 25 is disengaged from the stationary clutch section 24, the said bushing 22 and gear 23 will be permitted to run idle on the shaft 17 with the result that the rotation of the lens clamping shafts 28 and 29 will be stopped.

A weight 33 is mounted on top of the carriage and tends to swing the same about its pivot to urge it towards the grinding stone 15 and to hold the lens 30 within the groove 16 thereof, while adjacent the lower part of the carriage and carried thereby is a pivoted latch member 34 adapted to hook under the lip 35 for the purpose of holding the free or upper end of said carriage away from said stone or in inoperative position such as when it is desired to change lenses or when the machine is not in use.

Secured to the base member 10 at one side thereof is a support 36 having the recess 37 formed in the upper end thereof and carried by this support is the means for automatically moving the lens away from the grinding stone after it has been ground to the desired size.

This automatic throwout mechanism is generally designated by the reference character 38 and comprises in its construction a base 39 provided immediately adjacent its forward end with the depending lug 40, which is positioned within the recess 37 and pivotally mounted on the transverse shaft 41. Formed in the base 39, is a guide way 42 in which is slidably arranged a guiding element 43, adjustable by means of the thumb screw 44 and the threaded shank 45. Supported by the guiding element 43 is a block 46, provided with a plurality of guiding edges 47, any one of which may be brought into position for engagement by the former 48 carried by the shaft 29 outwardly of the gear wheel 31.

Rotatably mounted within the support rearwardly of the lug 40 and projecting therebeyond at both sides thereof is a transversely arranged shaft 49 and carried by this shaft and positioned within the recess 37 is a cam member 50 having the raised portion 51 arranged to engage the hardened pin 52 secured to the depending portion 53 of the base 39 so that as the shaft 49 is rotated the raised portion 51 of the cam member 50 engaging said pin will cause the base to be rocked on its pivot with the result that the block 46 contacting with the former 48 will force the lens carriage 27 and the lens 30 outwardly and away from the grinding stone 15. As the carriage 27 is rocked on its pivot, the latch member 34 will hook under the lip 35 for the purpose of holding the said carriage together with the lens away from said stone.

In order to simplify the operation of the present machine there is also provided means for automatically stopping the rotation of the lens after it has been moved away from the grinding stone, said means comprising a bracket member 54 formed integrally with the support 36, said bracket member carrying the substantially horizontal bearing 55 in which is mounted for pivotal movement, the shaft 56 which projects at each end therebeyond.

Secured to the forward end of the shaft 56 is a yoke 57, the legs 58 of which straddle the movable clutch section 25 and are provided with the transverse pins 59 which are loosely received within the circumferential groove 60 of said clutch section so as to permit the rotation thereof with the shaft 17 while secured to the opposite end of said shaft 56 is a standard 61 having the vertically spaced jaws 62 between which is pivotally mounted the lever 63, the inner end of which is formed with a latch 64, the inner end of said lever projecting through an opening 65 in the support and the latch 64 arranged to hook over the side wall thereof as is clearly shown in Figure 7. Thus, when the lever 63 is moved inwardly and the latch 64 snapped over the wall of the support, the shaft 56 is rocked within the bearing 55 and the movable clutch section 25 simultaneously moved inwardly to engage with the stationary clutch section 24.

A spring 66, having one end thereof secured to the lever 63 and the other end to the standard 61 serves to firmly retain the latch 64 in engagement with the support, and the movable clutch section engaged with the stationary clutch section while a second spring 67 having one end thereof secured to the support 36 and its opposite end secured to an arm 68 carried by the shaft 56 and projecting downwardly and inwardly therefrom serves to rock said shaft within the bearing 55 when the latch is disengaged from the support with the result that the movable clutch section 25 will be moved outwardly and away from the stationary clutch section 24 whereby to stop the rotation of the lens.

While the lever 63 could be operated by hand and the movable clutch section thus disengaged from the stationary clutch section so as to stop the rotation of the lens, yet it is desirable that this operation be performed automatically, and to this end, there is carried by the shaft 49 outwardly of the support a wheel 69 having a pin 70 secured to the periphery thereof which pin is arranged to engage the shoulder 71 formed on the lever 63 with the result that as the shaft is rotated and the raised portion 51 of the cam member 50 engages with the pin 52, the throwout mechanism will be moved upwardly about its pivot whereupon the block 46 engaging with the former 48 will force the carriage 27 and the lens 30 away from the grinding stone and at approximately the same time, the pin 70 will contact with the shoulder 71 with the result that the lever 63 will be moved upwardly and the latch disengaged from the support. The spring 67 will then cause the shaft 56 to be rotated within the bearing 55 and the movable clutch section 25 will slide out of engagement with the stationary clutch section 24. Inasmuch as power is transmitted to the lens clamping shafts only when the movable clutch section 25 is in engagement with the stationary clutch section 24, it will be readily seen that when these sections are disengaged the bushing 22 and the gear 23 will be permitted to run idle within the bearing 19 and the rotation of the lens clamping shafts thereby stopped.

In order that the pin 70 may be allowed to pass the lever 63 and the shaft permitted to freely rotate, the said shoulder 71 is formed with a slot 72 so that as the pin engages said shoulder and forces the lever upwardly, the said lever travelling in an arc will cause the slot to be brought into alignment with said pin whereupon the said pin will pass therethrough.

For the purpose of rotating the shaft 49, there is fixed to the shaft 17 inwardly of and adjacent the gear 23 an eccentric 73 and loosely carried by and encircling this eccentric is a ring 74, in which is threaded one end of the pawl 75 the opposite end of which engages with the ratchet 76 secured to the inner end of said transverse shaft 49.

In the complete operation of the machine, a lens is first clamped between the clamping shafts 28 and 29 and the lever 63 moved inwardly until the latch snaps over the wall of the support, the movable clutch section 25 being simultaneously moved into engagement with the stationary clutch section 24. Power is then transmitted from the driving pulley 14 to the shaft 17 in the manner above stated and then to the lens clamping shaft through the gears 21, 31 and 32, whereby the lens will be rotated within the groove of the grinding stone.

As the shaft 17 is rotated, the eccentric 73 moving therewith will cause the pawl 75 to be reciprocated back and forth with the result that as it is drawn forwardly, it will ride over the teeth of the ratchet 76 and as it is moved backwardly it will engage said teeth and cause the ratchet together with the transverse shaft 49, the cam member 50 and the wheel 70 to be rotated a distance equal to the number of teeth taken up during its forward movement. Therefore, each rotation of the shaft 17 will rotate the shaft 49 a predetermined distance according to the number of teeth taken up by the pawl during its forward movement which distance may be regulated by either shortening or lengthening said pawl through the medium of its threaded connection with the ring 74 thus serving to determine the number of revolutions of the lens within the groove of the grinding stone prior to its being moved away therefrom, it of course being readily understood that, because of the arrangement of gearing, the lens and the grinding stone will rotate a number of times while the ratchet rotates once.

During one complete rotation of the ratchet, the lens is rotated a sufficient number of times to insure the proper surfacing thereof, so that as the full revolution of the ratchet is completed, the raised portion 51 of the cam member 50 will contact with the pin 52 and force the automatic throwout means upwardly to move the carriage and lens away from the grinding stone. When the carriage 27 is thus moved on its pivot, the latch member 34 will hook under the lip 35 for the purpose of retaining said carriage in inoperative position. Almost simultaneous with this operation, the pin 70 will engage the shoulder 71 and force the lever 63 upwardly whereupon the shaft 56 will be rocked within the bearing 55 due to the tension of the spring 67 whereupon the clutch sections will be disengaged and the rotation of said lens stopped.

From the above, it will be readily appreciated that there has been provided an improved bevel edging machine having automatic means for moving the lens out of engagement with the stone when it has been ground to the predetermined desired size and shape and, in addition, also having means for automatically stopping the rotation of the lens after it has been thrown out of engagement with the stone. It will of course be understood and readily appreciated that in the commercial production of this machine, various changes in the particular construction and arrangement of the various parts may suggest themselves and the right is hereby reserved to make such changes as may fall within the scope of the appended claims without departing from or sacrificing the spirit of the invention.

What is claimed is:

1. In a machine of the character described, a base member, a shaft in the base member, a lens carriage pivotally mounted on said shaft, lens clamping shafts contained within said carriage, a support secured to said base member, means carried by said support for moving said carriage about its pivot, and means also carried by said support and cooperating with said first named shaft whereby to start or stop the rotation of the said clamping shafts.

2. In a machine of the character described, a base member, a shaft carried by said base member, a lens carriage pivotally mounted on said shaft, lens clamping shafts contained within said carriage, a support secured to said base member, means for controlling the movement of the lens carriage on its pivot pivotally carried by said support, a rockable shaft also carried by said support and having connection with said first named shaft, a second shaft also carried by said support, and means carried by the last named shaft for moving the said carriage controlling means about its pivot and for causing rocking movement of the said rockable shaft.

3. In a machine of the character described, a base member, a shaft carried by said base member, a lens carriage pivotally mounted on said shaft, lens clamping shafts contained within said carriage, a support secured to said base member, a guiding element pivotally carried by said support, a rockable shaft also carried by said support and having connection with said lens carriage shaft, a lever carried by the rockable shaft and engaging said support, and means also carried by said support for moving the guiding element about its pivot and means for disengaging the said lever from the support.

4. In a machine of the character described having a grindstone, a shaft, a lens carriage pivotally mounted on the shaft to hold the lens against the grindstone, lens clamps carried by the lens carriage, a clutch on the shaft, a second shaft spaced from the first shaft, means for transmitting intermittent motion to the second shaft, means on the second shaft for controlling the pivotal movement of the lens carriage towards the stone, movable means engaging the clutch, means on the second shaft to operate the movable clutch engaging means, and means on the second shaft for forcing the lens carriage away from the grindstone when the lens has been ground to size.

5. In a machine of the character described, a grindstone, a shaft, a lens carriage pivotally mounted on the shaft to hold the lens against the grindstone, lens clamps carried by the lens carriage, a clutch on the shaft, a second shaft spaced from the first shaft, means for transmitting intermittent motion to the second shaft, cam means on the second shaft for controlling the pivotal movement of the lens shaft towards the grindstone, movable means engaging the clutch, means on the first shaft to operate the movable clutch engaging means, cam means on the second shaft for forcing the lens carriage away from the grindstone when the lens has been ground to size, and means to lock the lens carriage in said position out of engagement with the grindstone.

WILLIAM A. GUNNING.